Sept. 13, 1966  J. S. SENEY  3,272,012
HIGH SPEED SCANNING SYSTEM
Filed Sept. 9, 1959  7 Sheets-Sheet 4

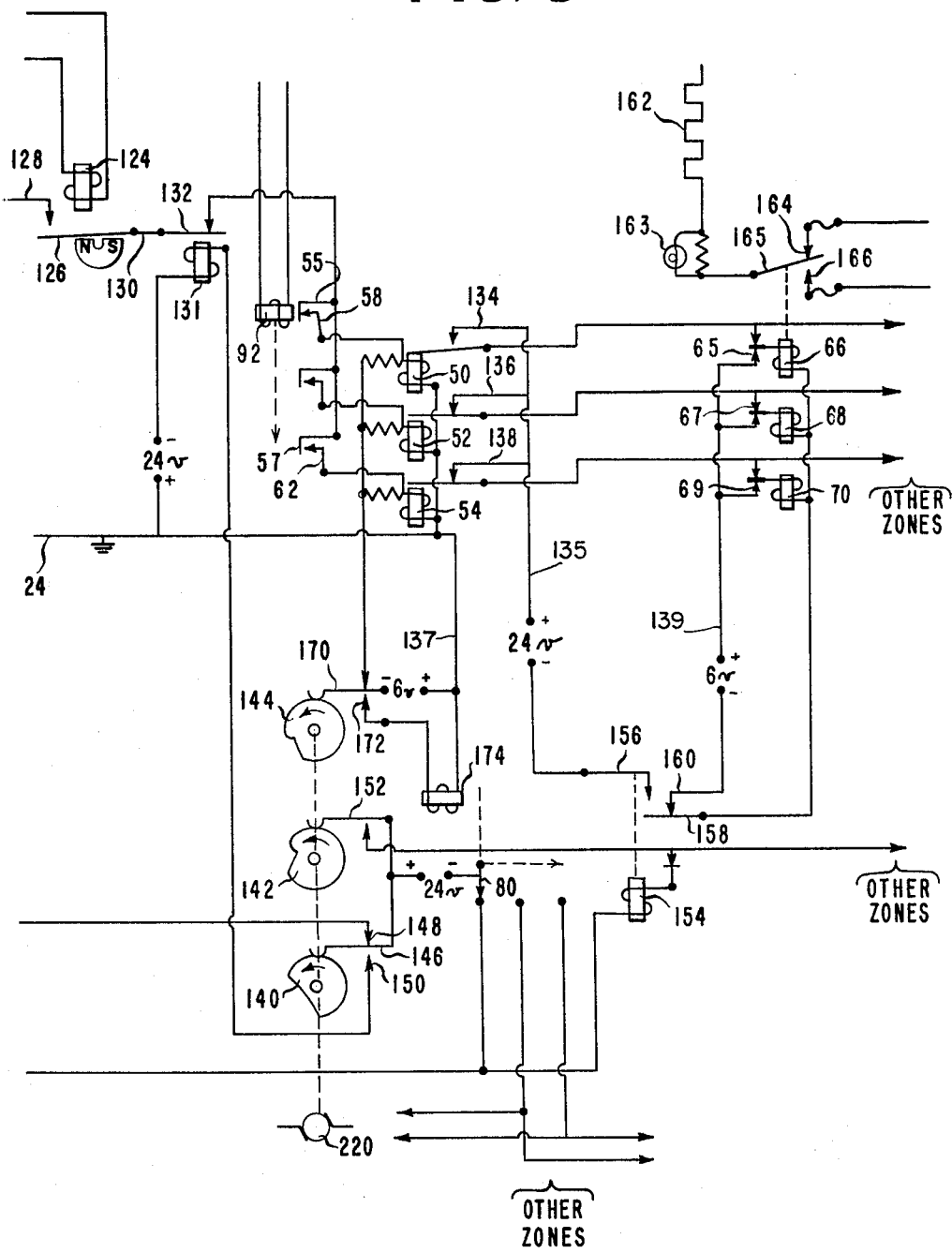
Sept. 13, 1966     J. S. SENEY     3,272,012
HIGH SPEED SCANNING SYSTEM
Filed Sept. 9, 1959     FIG. 6     7 Sheets-Sheet 5

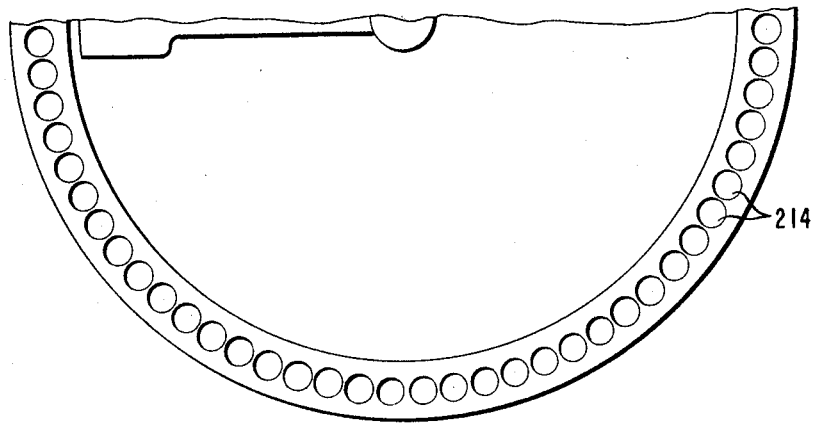
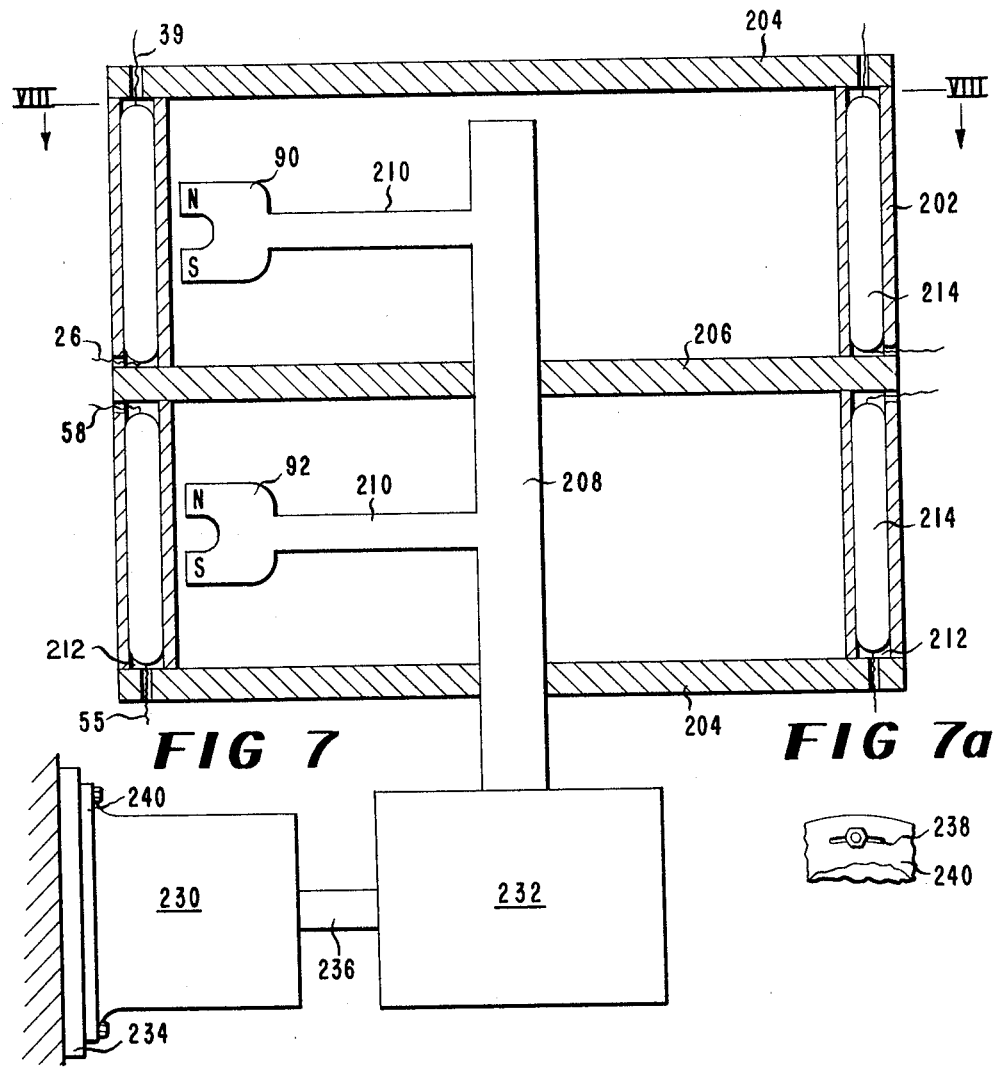

United States Patent Office 3,272,012
Patented Sept. 13, 1966

1

3,272,012
HIGH SPEED SCANNING SYSTEM
John S. Seney, Seaford, Del., assignor to E. I. du Pont de Nemours and Company, Wilmington, Del., a corporation of Delaware
Filed Sept. 9, 1959, Ser. No. 838,985
22 Claims. (Cl. 73—341)

This invention relates generally to the automatic control of plural conditions such as temperatures, pressures, pH readings and stresses and is more particularly related to a high speed scanning system for processing low voltage signals from sensing elements located at various control points.

With the ever increasing number of variable conditions in modern manufacturing processes, centralized supervision of these conditions has become a necessity. One system that has been employed features the use of a multi-point scanning instrument having a manually operable selector switch movable from point to point. With such a system, which is analogous to a conventional temperature switchboard, a multitude of thermocouples installed in the plant may be checked periodically by the supervising engineer.

The most important objective of the present invention is the provision of a fully automatic, high speed system for sequentially distributing signals representative of the multitude of controlled conditions in a manufacturing process.

Another important object of the invention is to provide a scanning-switch assembly which automatically and sequentially forwards the signals from the controlled conditions through a single analysis circuit.

An equally important objective is the provision of apparatus by means of which the various sensed signals are divided into zones and processed through the switch assembly and analysis circuit zone by zone.

It is also an object of the invention to provide a multi-point condition control system which is at all stages synchronized with the zero current points of the line A.C. for such purposes as minimizing relay contact arcing and fixing the effect of induced voltage errors and the like.

A further object of the invention is to provide circuit components permitting adjustment of the signal level from individual sensing elements in each zone, as well as an adjustment for each of the several zones; for generating a reference signal; for comparison of the reference signal with each sensed signal; for generation of a control signal whenever the comparison component indicates that a sensed condition requires control; to provide a memory matrix which retains the information from the individual points in a zone until that zone is read out of the system; and the provision of a component for transferring the switch assembly, analysis circuit and memory matrix successively from zone to zone.

With these and other objects in view, the multi-point condition control system of the present invention comprises generally a plurality of individual sensing elements divided into two or more zones, a relay for each element which relay is adapted to control the corresponding sensed condition, circuitry for generating a reference signal, comparing the reference signal to a sensed signal and generating a control signal, a scanning switch assembly for sequentially and simultaneously coupling said circuitry between the elements and corresponding relays of a selected zone, and a zone selection means for switching the circuitry and assembly from zone to zone.

Other objectives, such as providing means for checking the operation of the system, avoiding the effect of gain in the signal amplification component, incorporating the signal comparison component into the grid circuit of a trigger tube, energizing rotatably mounted circuit components without the use of slip rings, providing anti-hunt means for stabilizing the system and avoiding sneak signals between the various power relays in a zone, will become apparent in the following description wherein reference is made by the use of designating numerals to the accompanying drawings, in which:

FIG. 6 is a wiring diagram of the relays and read-out mechanisms shown schematically in FIG. 1;

FIG. 7 is a transverse cross section of the scanning switch of the present invention;

FIG. 7A is a partial end view of the motor shown in FIG. 7;

FIG. 8 is a view taken on lines VIII—VIII of FIG. 7, looking in the direction of the arrows;

Figure 1:
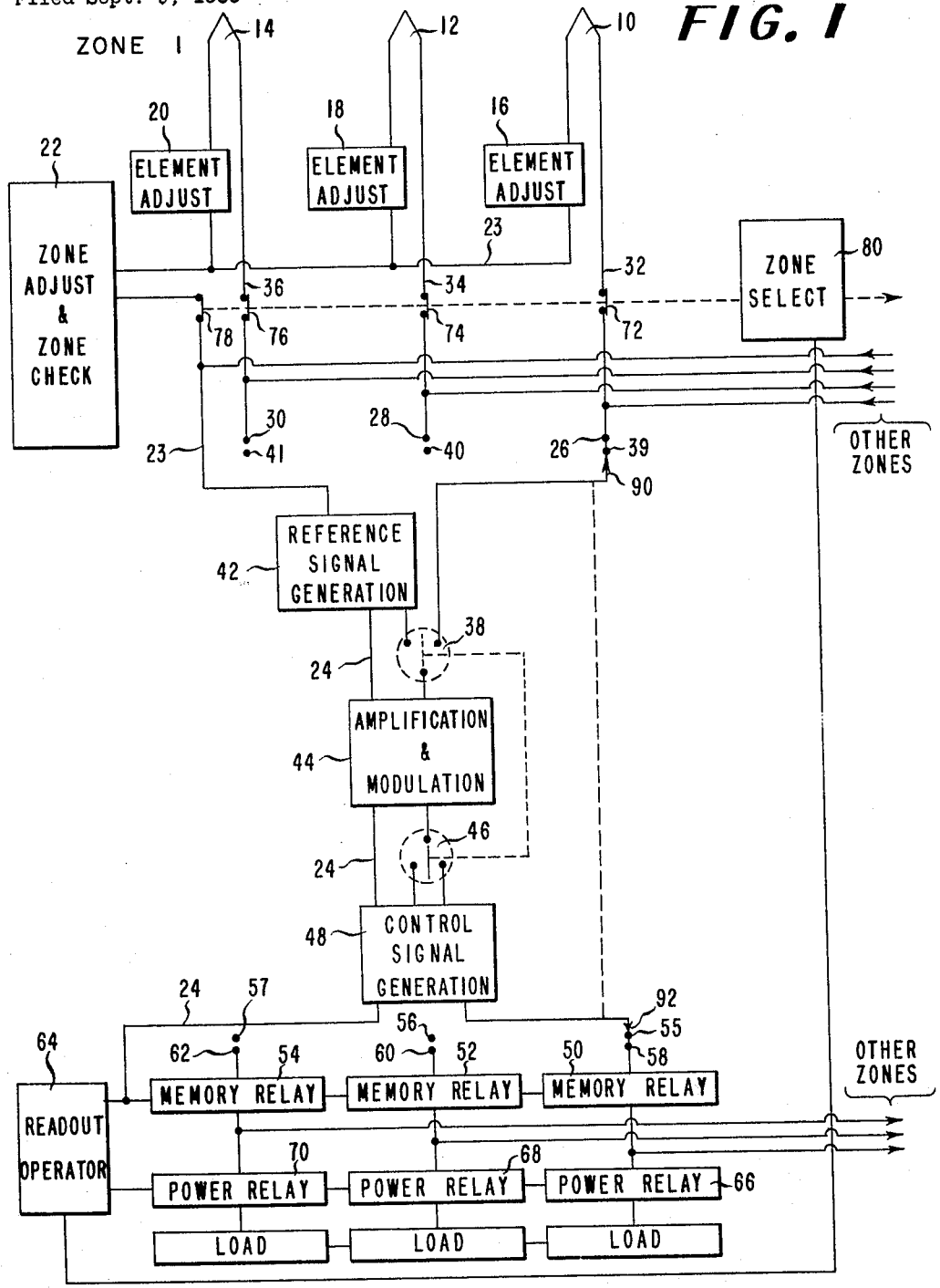
FIGURE 1 is a schematic diagram of the instant control system, showing one complete zone as well as the tie lines leading to succeeding zones.

The multi-point condition control system of the present invention, which is illustrated schematically in FIG. 1, includes a number of zones of individual sensing elements each of which zones is adapted to be coupled by a scanning switch assembly with a common analysis circuit which in turn forwards a control signal through the scanning switch assembly to the individual power control relays. As will be explained subsequently (FIG. 7), the scanner switch assembly consists of two parallel banks of magnetically operated mercury wetted switches. The input bank receives the signals from the sensing elements and the output bank distributes signals to control the sensed condition. In the zone which has been illustrated, three sensing elements 10, 12, 14 are provided with individual set point or adjustment circuits 16, 18, 20 which are connected to a zone adjustment and check circuit 22 through a common lead 23, and with the scanning switch contacts 26, 28, 30 through leads 32, 34, 36. These scanning switch contacts are sequentially coupled with an input chopper 38 through a second set of scanning switch contacts 39, 40, 41. Chopper 38 alternately forwards a sensed signal from one of the elements 10, 12, 14 and a reference signal from generator 42 to an amplification and modulation circuit 44 from which the amplified signals are alternately forwarded to an output chopper 46. The chopped, amplified signals are compared in a control signal generation component 48 which includes a tube for triggering the memory relays 50, 52, 54 when the scanned signal from the corresponding sensing element indicates a demand for control. Such a control signal is transmitted through one of the contacts 55, 56, 57 to one of the pivoted contacts 58, 60, 62 (FIG. 3) of the output bank which is synchronized with the input bank of the scanner switch assembly. When the moving switch actuators 90, 92 have traveled through the entire zone, a read-out operator 64 functions to transfer simultaneously any signals stored on the memory relays 50, 52, 54 to the associated power relays 66, 68, 70 which in turn control the application of power to the various sensed conditions. Operator 64 also functions to open a series of switches 72, 74, 76, 78 through a zone selector 80. A corresponding set of switches in the succeeding zone is subsequently closed to couple that zone with the scanning switch assembly and analysis circuit in the same manner as and through the tie lines shown in FIG. 1.

Figure 2:
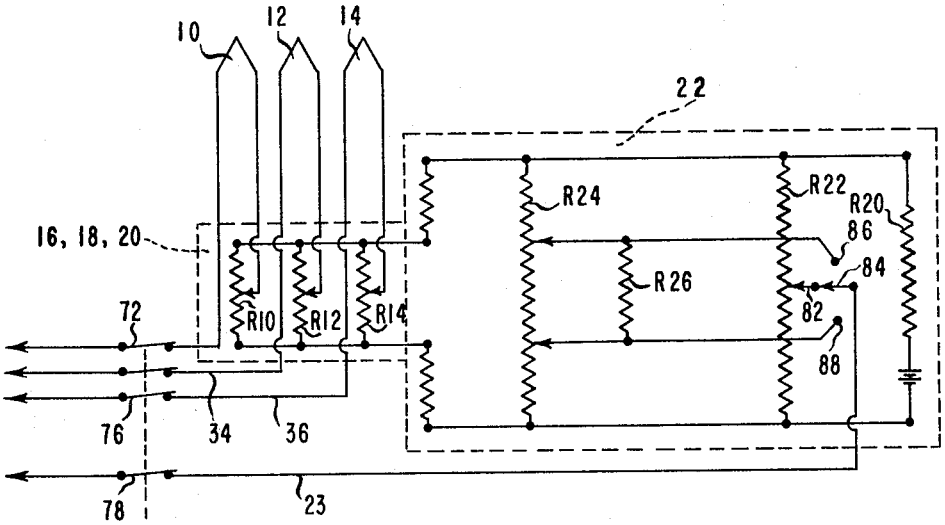
FIG. 2 is a diagram of the circuitry connected to the sensing elements of the illustrated zone.

In FIG. 2, the sensing elements 10, 12, 14 are shown connected to the variable resistors R10, R12 and R14, each of which is in a voltage dividing network which comprises the circuit 22 shown in FIG. 1. In the embodiment chosen for illustration, the sensing elements have shown as thermocouples. Any change in the level of the continuous signal from these elements is indicative of a temperature change in the controlled condition. The elements 10, 12, 14 are individually trimmed or calibrated by adjustment of their resistors R10, R12 and R14. This adjustment of the signal level also permits biasing out any undesirable induced voltages in the thermocouple leads. A single equalizing adjustment of each element suffices since the phase relationship between the line and the actuation of the scanning switches is maintained. This is accomplished, as will be explained more fully hereinafter, by positioning the frame of a polarized motor which drives the scanner switch assembly. The scanner switch assembly and its prime mover will be described in detail in connection with FIGS. 7–9. In network 22, the value of resistors R20, R22 and the position of an adjustable tap 82 relative to resistor R22 determines the range of operation as well as the set point for the zone.

Located in the circuit 22 is a zone check switch 84 which in normal operation is in contact with adjustable tap 82. Movement of the switch 84 to contact 86 or contact 88 functions to raise or lower the set point voltage of the zone and to scan a deliberate plus or minor error into each of the power relays 66–70. This causes the indicator lamps 163 which are connected in the parallel with the load resistors (FIG. 6) to glow bright or dim, respectively. Any lamp not following this pattern indicates a condition which is not being properly controlled. Thus, in conjunction with zone set point adjustment, a check switch is provided for testing the operation of each zone.

Figure 3:
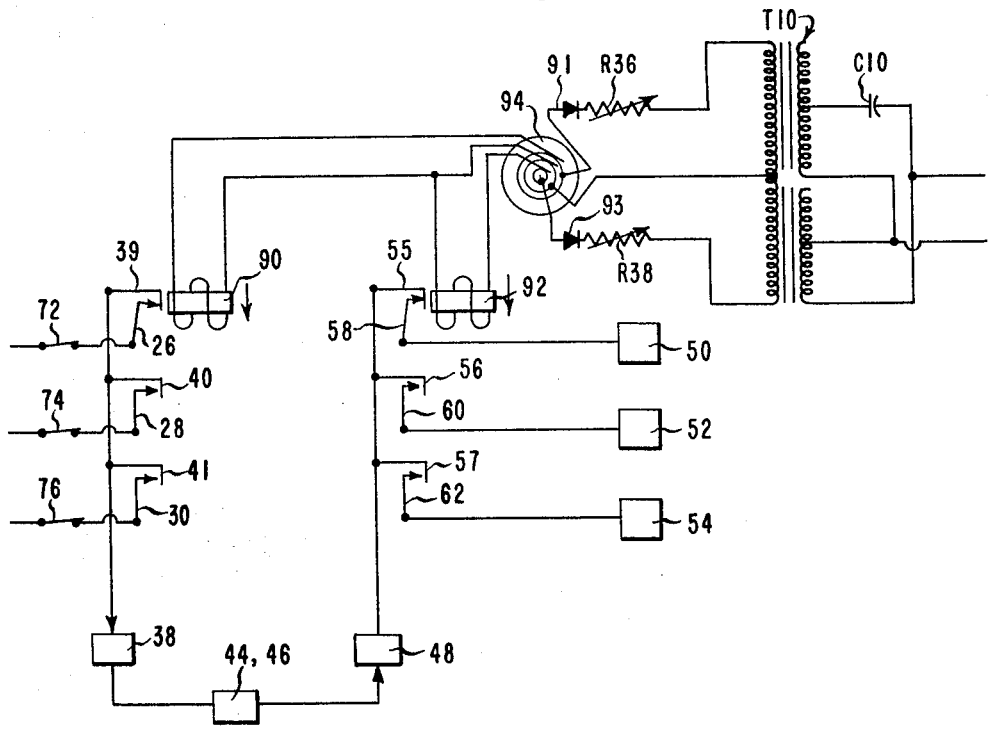
FIG. 3 is a wiring diagram of the scanning-switch assembly shown schematically in FIG. 1.

The wiring diagram of FIG. 3 shows further details of the scanning switch assembly in which the normally open switches 26–30 of the input bank are actuated sequentially by an electromagnet 90. The switch 26 is shown in the closed position in FIG. 3 so that the circuit from sensing element 10 is completed and the sensed signal is delivered to components 38, 44, 46, 48 for further processing. Any control signal resulting therefrom is simultaneously forwarded through closed switch 58 to the memory relay 50, switch 58 having been closed by electromagnet 92. Magnets 90, 92 are energized from slip rings 94 which receive the output of a transformer T10 through resistors R36, R38 and rectifiers 91, 93. The current supplied to magnet 90 is advanced a fraction of a cycle by the provision of a condenser C10. The resulting time difference between the energization of magnets 90, 92 allows a signal sensed by element 10 to be processed through the components 38, 44, 46, 48 before switch 58 in the output bank of the scanner switch assembly opens. This adjustment in the signal input side permits the signal output side to make up for the inherent mechanical lag in the scanner switch contacts and thus insures that the input and output signals are processed in their correct phase relationship.

Figure 4:
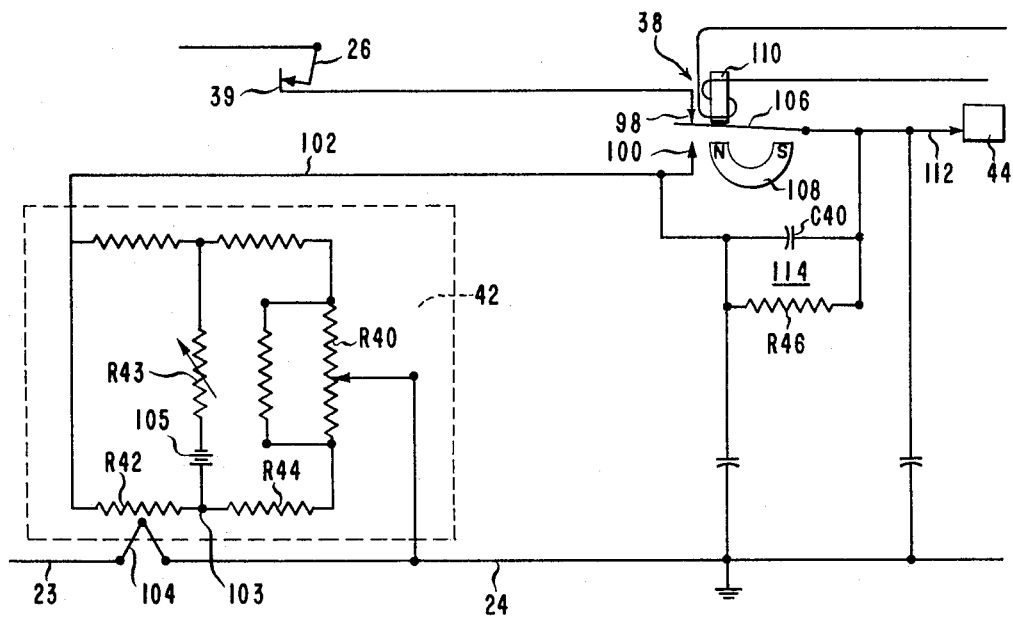
FIG. 4 is a wiring diagram of the reference signal generator and input chopper shown schematically in FIG. 1.

The components 38 and 42 are shown in further detail in the wiring diagram of FIG. 4. The sensed signal passing from element 10 through switch contact 26 is forwarded continuously to a contact 98 of input chopper 38. The reference signal generator 42 is another voltage divider network, the E.M.F. output of which is adjusted by the variable resistor R40. Compensatory adjustments for variations at the battery 105 are accomplished at resistor R43. The output of network 42 is forwarded continuously to a second contact 100 of chopper 38 via lead 102 and is used as the reference or comparison signal for each element in each zone of the system. A resistor R42, in network 42, changes its value with changes in ambient temperature as does a cold junction thermocouple 104. Thermocouple 104 is the cold junction for the sensing thermocouples 10, 12, 14 and is connected thereto through lead 23. To insure proper response, the thermocouple 104 is thermally bonded to but electrically isolated from resistor R42. A value is chosen so that the voltage drop across R42 exactly balances the voltage drop across opposing resistor R44 at 0° C. The resultant voltage at terminal 103 is then zero and no compensation is applied to the network. With a rise in the ambient temperature, there is a corresponding rise in the voltage drop across R42 which increase is subtracted in network 42 from the network output as an automatic compensation for the ambient temperature change at the cold junction. Since the cold junction 104 is thermally bonded to R42, the responses are substantially instantaneous.

As shown in FIG. 4, the chopper 38 has a moving switch arm 106 which is vibrated between contacts 98, 100 by the combined action of a magnet 108 and an electromagnet 110. The electromagnet 110 is line frequency driven so that the vibrating arm 106 vibrates cyclically with the changes in polarity on the line and in synchronism with the actuation of the scanner switches 26, 28, 30 and 58, 60, 62 (FIG. 3). The chopped signal on switch arm 106 and its lead 112 is alternately a sensed signal from one of the sensing elements and the reference signal from lead 102.

As a result of the high sensitivity of the amplifier and trigger circuits 44, 48, noise pickup and the like must be filtered out of the system. As conventional RC filter would function to remove the noise but would also have a memory which would produce a carryover from one sensed signal to the next. Accordingly, a memory erasing filter network 114, including a resistor R46 and a condenser C40, is coupled between leads 102, 112. When contacts 98, 106 close, on the sensing half cycle, lead 112 is also biased by the reference E.M.F., with the result that any differential between the signals is partially biased out. This prevents saturation of the amplification circuit 44. When contacts 100, 106 close on the standardizing half cycle, any potential stored on C40 by the preceding sensed signal is shorted out and removed.

Input chopper 38 alternately delivers the biased sensed signal and the reference signal to the circuit 44 for modulation, amplification and demodulation and the amplified signals are alternately discharged through a lead 115 which connects (FIG. 5) with a vibrating arm 116 of output chopper 46. Since both signals pass through the same circuit 44, the system is automatically compensated for amplifier gain changes. Chopper 46 has an electromagnet 118 which, like the electromagnet 110, is line frequency driven. The arms 106, 116 change contacts once each half cycle, i.e., once each 1/120 second if the line is at 60 cycles. When arm 116 is on a contact 120, the reference signal is transmitted to a comparison component which is incorporated into the grid control circuit of the thyratron or trigger tube 77 shown in FIG. 5. The reference signal charges condensers C50 and C52 through resistor R52 to the polarities shown in the drawings. The trigger tube 77 cannot fire during this half cycle because the anode voltage is negative. On the opposite half cycle, arm 116 is on a contact 122 and an amplified sensed signal charges the grid through resistor R50. Since C50 was left charged by the reference signal in a direction to make the grid negative relative to the cathode, tube 77 will not trigger when its anode becomes positive unless the sensed signal level is less than that of the reference. In this event, the negative voltage stored on C50 is discharged and the grid becomes less negative than the cathode with the result that the tube fires on this half cycle. When the tube fires, the anode circuit and a master relay 124 coupled therewith are energized and a relay switch arm 126 makes contact with a control signal source 128. The control signal is transmitted through a lead 130 to the memory matrix, i.e., to relay 50 (FIGS. 1 and 6). Switch arm 126 is returned to its normally open position on the next half cycle by a flow of current through diode 127.

The D.C. potential on lead 130 reaches the memory matrix through the normally closed relay switch 132 and the now closed output bank scanner switch 55, 58, as shown in FIG. 6. Energization of relay 50 opens the normally closed switch 134. With the switch 134 open, a 24 volt circuit 135 to the power relay coil 66 through one-half of a double diode rectifier 65 is broken. The same sequence of events reoccurs as the magnets 90, 92 move from switch to switch. In the absence of a control signal, the switches 134, 136, 138 remain closed and the 24 volt control circuit 135 to the power relay coils through rectifiers 65, 67, 69 remains in a ready condition. Once actuated by a control signal, the relay switches 134, 136, 138 remain open by the action of the 6 volt holding circuit 137 connected in parallel with the coils of memory relays 50-54.

The read-out operator 64 (FIG. 1) which regulates the timing cycle of the scanning operation includes (FIG. 6) a front cam 140, a center cam 142, and a rear cam 144. The front cam 140 reaches its flat portion at the time when a selected zone has been scanned moves the switch arm 146 from contact 148 to contact 150. With contact 150 closed, the circuit to the relay coil 131 for switch 132 is closed to disconnect the memory matrix from the rest of the system. Simultaneously, the circuit to the switches 72-78 of the selected zone is opened at contact 148. Center cam 142 actuates a switch arm 152 simultaneously with the movement of switch 146. This closes the circuit to a zone transfer actuator, illustrated as a relay 154, energization of which functions to pivot a switch arm 156 into contact with a pivoted arm 158 and to move the latter away from fixed contact 160. Contact of arm 156 with arm 158 acts to close the 24 volt circuit 135 to the power relay control circuit and thus energizes those power relays still in the ready condition. For example, the 24 volt circuit to the coil of relay 68 would be closed and ready through switch 136 whereas that to relay 66 would be broken by the control signal which energized the memory relay 50. In FIG. 6, only relay 66 has been shown coupled to a load, the loads coupled to the relays 68 and 70 having been omitted for purposes of clarity. In the embodiment chosen for illustration, the load has been illustrated as an electric heater 162 which is normally connected to a high power contact 164 and which is connected to its low power contact 166 when pulled in by relay 66. Any of the power relays 66-70 which receive a 24 volt pulse as a result of the energization of transfer relay 154 are held in, when switch 152 moves back to the high portion of cam 142, by the 6 volt holding circuit 139 through then closed contact 160.

The rear cam 144 has associated therewith a switch arm 170 which normally closes the 6 volt holding circuit 137 for the memory relays. This switch is moved to its contact 172, subsequently to the movement of switch arms 146, 152, and thus closes the circuit to a relay 174 which functions to index the zone selector switch 80, shown also in FIG. 1, to the succeeding zone, so that when switch 146 again reaches the high portion of cam 140, a set of switches corresponding to the switches 72-78 in FIG. 1 will be closed to connect the scanner switch assembly, the analysis circuit and the memory matrix to such succeeding zone, i.e., the scanning operation is transferred to the following zone.

Figure 9:
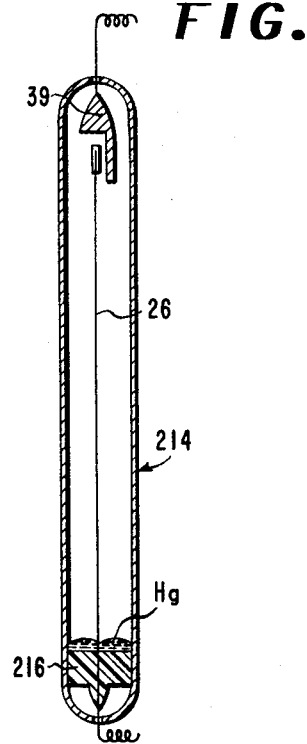
FIG. 9 is a longitudinal sectional view through one of the switches shown in FIG. 7.

A preferred embodiment of the scanner switch assembly shown schematically in FIGS. 1-6 is illustrated in further detail in FIGS. 7-9 wherein it is seen that the assembly includes a drum having a cylindrical side wall 202, a pair of end walls 204, and a center wall 206. A shaft 208 passes through one of the end walls 204 and the center wall 206 and is rotatably driven by a motor 230 through a suitable speed change device 232. This shaft is provided with a pair of radially aligned arms 210 on the outer extremities of which the electromagnets 90-92 are located. The wiring details of the electromagnets 90, 92 are shown in FIG. 3. Side wall 202 has a plurality of axially extending recesses 212 in each of which one of the switches 214 is located on each side of center wall 206. As shown in FIG. 9, each of the switches comprises an elongated pressure sealed tube containing hydrogen gas at 250 lbs./sq. inch, which tube has an insulating base 216 at one end and a fixed switch contact such as 39 or 55 (see FIGS. 1 and 3) at the opposite end. Extending outwardly from base 216 toward the fixed contact is a flexible switch arm such as 26 or 58 which is attracted to the fixed contact by one of the magnets 90-92. A small pool of mercury within tube 214 is sufficient to wet the switch contacts by capillary attraction.

As mentioned previously, the phase relationship between line frequency and the actuation of the scanner switches is accomplished by adjustment of the position of the frame of motor 230, i.e., by a relative adjustment between the motor stator and support plate 234 for the motor shaft 236. This adjustment is facilitated by the provision of slots 238 (FIG. 7A) in the flange 240 on motor frame 230. A similar adjustment feature is provided for the motor 220 shown in FIG. 6.

*Operation*

Figure 5:
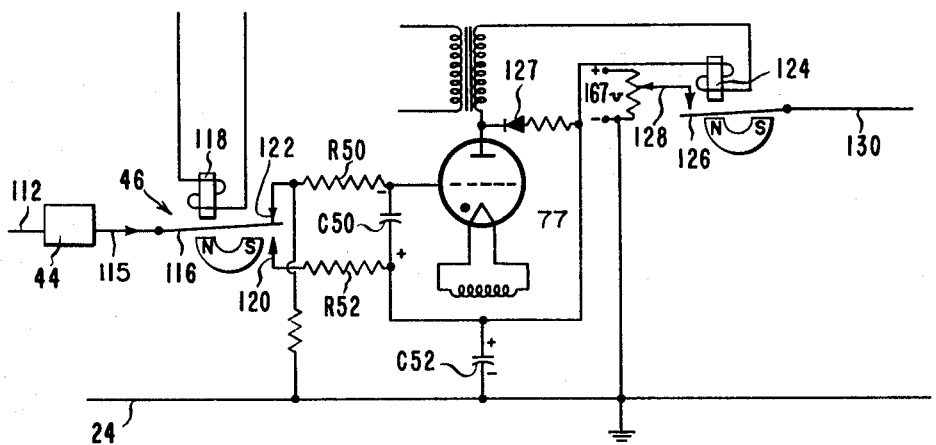
FIG. 5 is a wiring diagram of the comparison and trigger components of the analysis circuit.

Operation of the disclosed system is initiated by energizing the motor 230 which drives shaft 208 of the scanner switch assembly and the polarized synchronous motor 220 which drives the cams 140-144. The other components are energized by suitable connections with their line source or battery. Assuming that the switch 146 is on the high part of cam 140, the circuit to the switches 72-78 of one zone will be closed. As the magnet 90 passes one of the input bank switches, a circuit is completed from the corresponding sensing element to the control signal generation component 48 wherein the sensed signal is compared with the reference voltage in the grid circuit of trigger tube 77 (FIG. 5). When the sensed signal is low, indicating a heat requirement at the sensed condition, the thyratron 77 is fired and a control signal passes through the corresponding (e.g., switch 58) in the output bank to the associated memory relay (e.g., relay 50). Thus, the signal from sensing element 10 passes through lead 32, switch 72, switch 26, input chopper 38, circuit 44, output chopper 46, trigger circuit 48, and switch 55, 58 to the memory relay 50. The use of both an input and an output chopper with the circuit 44 allows the two signals to pass through the same amplifier so that any drift or weakening of tubes will affect both signals equally. Thus, no time consuming stabilizing period is required. In circuit 44, the chopped signals pass through a 60 kc. modulation stage, five stages of RF amplification, a demodulation stage, and further amplification stages. The details of circuit 44 have not been illustrated since they are conventional. The signals from elements 12, 14 are similarly passed through the system in succession. After the entire zone has been read into the memory matrix, switch 146 of readout operator 64 reaches the low portion of cam 140 to energize the killer relay 131 and thereby open switch 132 (FIG. 6). The circuit to switches 72-78 of the selected zone is also opened at contact 148. Simultaneously, switch 152, associated with cam 142, is closed to energize relay 154 and close switch 156. A 24 volt signal is then sent to the power relay bus through circuit 135 and any of the power relays 66-70 remaining in the ready condition is energized, i.e., when the heat level of the controlled condition is satisfactory, the associated power relay is energized to pull its switch to the low heat position. The opening or closing of the power relays takes place in phase with the power source for load 162 and the loads associated with the other sensed conditions, so that the high heat load circuit is only disrupted at the point of zero line current. This phase relationship is accomplished by the exact positioning of the frame of motor 220. Enough tolerance is left in the motor mounting holes, in the same manner as shown in FIG. 7A, to advance or retard the phase position of the motor, i.e., cams 140, 142 are synchronized with the zero current point of the line frequency on contacts 164, 166. Since a relatively high voltage pulse (24 volts) is used to pull in the power relays and since the pull-in is synchronized with a zero current point on the load line, contact arcing is reduced to a minimum when power to the loads is disrupted.

Upon energization, the power relays 66–70 function to pull in the load switch associated therewith from the high to the low heat position. In FIG. 6, the load switch corresponding to sensing element 10 has been designated by the numeral 165; switch 165 would remain at the high heat position since the 24 volt circuit to power relay 66 is shown broken at switch 134. Assuming that no control signal was received, the power relays 68, 70 would be pulled into the low heat position and held there by the 6 volt holding circuit 139 when relay 154 is deenergized and switch 158 returns to fixed contact 160 (corresponding to the high portion of cam 142). Switch 170 subsequently reaches the low portion of cam 144 and contact 172 is closed with the result that relay 174 is energized and selector 80 is indexed to the next zone. At the same time, the holding circuit for the memory relays 50–54 is opened to reset any of the switches 134, 136, 138 which may have been actuated by the presence of a control signal. Thus, switch 134 would be retruned to its normally closed position. When switch arm 146 again reaches the high portion of cam 140, a second zone would be connected, through switches corresponding to the switches 72–78, to the analysis circuit 48 and the reset memory matrix 50–54.

As shown in FIGS. 1 and 6, the leads connecting the memory matrix with the power relays 66, 68, 70 are also tied to the power relays of the other zones in the system. The use of the two way rectifiers 65, 67, 69 precludes the possibility of any "sneak circuit" between the relays of a zone when the 24 volt circuit 135 is closed, as would be possible if the diodes were replaced with conventional load resistors.

When the system is in full automatic, the operation of any zone may be checked by moving switch 84 to each of contacts 86, 88 (FIG. 2) as that zone is scanned. The function of this is to momentarily raise or lower the zone set point by substituting either contact 86 or 88 for contact 82 in the network 22. If the controlled conditions within the checked zone are normally maintained, e.g., within ½% of set point and the set point is raised or lowered 1% by movement of switch 84, the power relays 66–70 will call for more or less control and the indicator lamps 163, only one of which is shown in FIG. 6, will glow bright or dim, respectively. Any lamp not following this pattern indicates that the particular controlled condition is not being maintained within 1% of its set point.

In a pilot model of the instant system, there are 72 switches in each of the input and output banks of the scanner switch assembly and the scanning device including shaft 208 is driven at 50 revolutions per minute so that the magnets 90, 92 pass from switch to switch in synchronism with a 60 cycle line frequency. Referring to FIG. 3, it is seen that magnets 90, 92 are energized from the line and are therefore energized in synchronism with the opening and closing of the scanner switches. Condenser C10 functions to advance the energization of magnet 90 by a fraction of a cycle so as to allow time for the signal to be processed before reaching the corresponding switch in the output bank. It is apparent that, in this pilot model, input signals are scanned and processed at the frequency of the line voltage and that higher scanning speeds can be achieved by putting a higher frequency on the line.

Figure 10:
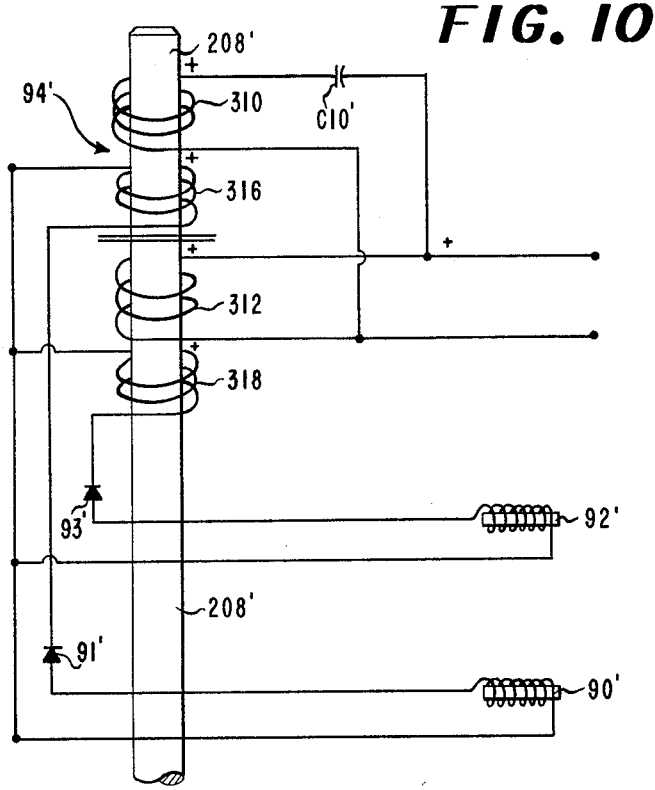
FIG. 10 is a schematic of an alternate means for exciting the scanner relays shown in FIG. 3.

In FIG. 3, the electromagnets 90, 92 are energized from the slip rings 94 which receive the rectified outputs of transformer T10. An alternate means of exciting the scanner magnet coils is illustrated in FIG. 10 wherein it is seen that two stationary, line connected primary coils 310, 312 are in surrounding relationship to a rotatable shaft 208′. Shaft 208′ is coupled to a motor corresponding to that which is designated 230 in FIG. 7. A pair of secondary coils 316, 318 rotate with the shaft 208′, as do the rectifiers 91′, 93′ and the electromagnets 90′, 92′. In this manner, the line current is induced from primary coils 310, 312 to secondary coils 316, 318 by a transformer action and is phased by the rectifiers 91′, 93′. This alternate embodiment has the obvious advantage of energizing magnets 90′, 92′ without the need for slip rings or other sliding contacts.

Figure 11:
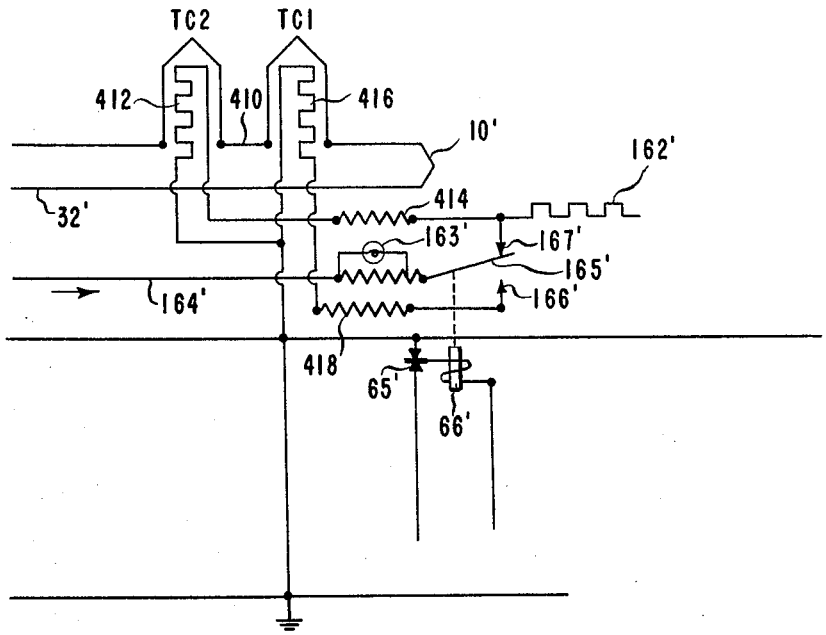
FIG. 11 is the wiring diagram of a stabilizing circuit which may be employed with the sensing elements.

There is illustrated in FIG. 11 a circuitry modification which may be incorporated into the system shown in FIGS. 1–9 to prevent overshooting the set point or hunting in the system. This stabilizing circuitry includes a pair of feed-back thermocouples TC1, TC2 which are connected in series with the iron lead of sensing element 10′. The constantan leads of the thermocouples TC1, TC2 are interconnected, as at 410. The thermocouples are each mounted inside a porcelain tube which has a 15 ohm non-inductive resistance wound thereon to serve as a heater which is thermally bonded to the tube with a high temperature wax. The two units are separated by a small, free air space to prevent any thermal coupling. The switch arm 165′ is connected to the high heat bus 164′ and normally closes the circuit through a contact 167′ which is coupled to the load 162′. The non-inductive resistance or heater 412 associated with TC2 is connected with the contact 167′ through a resistor 414. The heater 416 of TC1 is connected to contact 166′, the low heat contact, through a resistor 418. When power is being applied to the load through lead 164′ and contact 167′, the current will flow through heater 412 to heat TC2 about 10° C. above the ambient temperature. The output voltage of TC2 is added to that of the sensing element 10′ so that the latter will reach the set point E.M.F. slightly in advance of the time the sensed condition reaches the actual set point. A control signal will accordingly be generated and the power relay 66′ will be energized to pull in switch arm 165′ to low heat contact 166′. At this time, there is a flow of current through the heater 416 of TC1 and the combined E.M.F. from element 10′ reaches the set point in advance of the sensed condition so that power is again applied to the load. As mentioned previously, the feed-back increments from thermocouples TC1, TC2 add negative stability to the system so that no overshooting or hunting can occur.

Because of their small size and other desirable properties, thermocouples are used widely as temperature-sensitive devices in the measurement and control of temperatures. However, the apparatus generally used for converting the E.M.F. variataions to physical movements is costly and delicate. The system disclosed herein permits the use of a great number of thermocouple sensing elements in conjunction with but a single analysis circuit. In addition, the observations are made much more rapidly than was heretofore practicable. Although the disclosure has been more or less limited to thermocouple sensing elements, it is apparent that any sensing element which delivers microvoltage signals may be employed and that elements sensing different types of conditions may also be employed in the same system.

Obviously many changes and modifications may be made in the disclosed control system without departing from the spirit of the present invention which is therefore intended to be limited only by the scope of the appended claims.

I claim:
1. A multi-point condition control system comprising: a plurality of individual sensing elements divided into two or more zones, each element adapted to forward a signal; an electrical device associated with each element, each device being adapted to control a sensed condition; circuitry for generating a fixed level reference signal, for comparing alternately the reference and sensed signal levels, and for generating a control signal when there is an E.M.F. variation; a high speed scanning switch assembly coupling said circuitry between the elements and corresponding devices of a selected zone; and zone selection means for automatically switching said circuitry and scanning switch assembly from zone to zone.

2. A multi-point condition control system comprising: a plurality of individual sensing elements, each adapted to forward a voltage signal; an electrical device associated with each sensing element, each device being adapted to control a sensed condition; a circuit having components for generating a reference, fixed voltage level signal and for chopping the reference and a sensed signal, an RF amplication component receiving the chopped signals alternately as an input, an output chopping component for separating the amplified reference and sensed signals, and components for comparing the separated signals alternately and generating a control signal when there is an E.M.F. variation, said chopping components being line frequency driven; input and output banks of normally open switches for connecting the elements to said circuit and the circuit to said devices; a scanning device coupled with said banks for closing corresponding switches therein; and motive means coupled with the scanning device for moving it from switch to switch in cyclical synchronism with said chopping components.

3. The control system of claim 2 wherein a variable resistance voltage divider circuit is coupled with each sensing element for adjustment of the signal level to the E.M.F. of the reference signal.

4. The control system of claim 2 wherein said reference signal generator is a circuit having therein a voltage dividing network including a variable resistance whereby to permit adjustment of the reference signal E.M.F.

5. The control system of claim 4 wherein said network includes a pair of opposing resistances and wherein means is provided for compensating for ambient temperature variations, said compensating means comprising a cold junction thermocouple thermally bonded to one of said opposing resistances.

6. The control system of claim 2 wherein the input chopping component comprises: a first contact coupled electrically to the switches of said input bank; a second contact coupled to said reference signal generating component; and a third contact vibrating between said first and second contacts, said third contact being coupled to said RF amplification component.

7. The control system of claim 6 wherein is provided a filter circuit coupled between said second and third contacts to erase any residual of the preceding sensed signal when the second and third contacts close.

8. The control system of claim 2 wherein said output chopping component comprises: first and second contacts coupled to said comparison component; and a third contact vibrating between said first and second contacts, said third contact being coupled to said amplification component.

9. The control system of claim 8 wherein said control signal generating component comprises: a thyratron tube having a grid connected to said first contact of the output chopping component; and a capacitance interconnecting said first and second contacts of the output chopping component whereby to reduce the bias on said grid only when the sensed signal is below the reference signal level.

10. The control system of claim 2 wherein each electrical control device comprises: a relay coil connected to the corresponding switch in the output bank; a relay switch adapted to control the sensed condition; and a holding circuit coupled with said coil for holding the switch after it has been actuated by a control signal.

11. The control system of claim 10 wherein an electric load is associated with each sensed condition, each relay switch is in the circuit of a load, and stabilizing means is provided in the circuit of each element for including a feedback increment in the signal from the element whereby to advance the actuation of said relay switch.

12. A multi-point condition control system comprising: a plurality of individual sensing elements, each adapted to forward a voltage signal; a relay for each sensing element, each relay being adapted to control a sensed condition; circuitry for generating a reference, fixed voltage level signal, chopping the reference and sensed signals, amplifying the chopped signals, separating the amplified reference and sensed signals, comparing the separated signals, and generating a control signal when there is an E.M.F. variation; and a scanning switch assembly for sequentially coupling said circuitry between each element and its relay, said scanning switch assembly including an input bank of normally open, circularly disposed, magnetically responsive switches for connecting the elements to said circuitry, an output bank of normally open switches for connecting said circuitry to said relays, and a scanning device coupled with said banks for sequentially and substantially simultaneously closing corresponding switches in the input and output banks, said scanning device being a rotatable member having electromagnetic means thereon, the latter being in close proximity to said switches as the member rotates and being coupled with the line whereby to permit actuation of the switches at line frequency.

13. The control system of claim 12 wherein each of said sensing elements has a variable resistance coupled therewith to permit adjustment of the signal level and biasing out of induced voltages and wherein means is provided in the circuit of said electromagnetic means for advancing the actuation of said input bank switches with respect to the output bank switches.

14. A multi-point condition control system comprising: a plurality of individual sensing elements, each adapted to forward a voltage signal; a relay means for each sensing element, each relay means being adapted to control a sensed condition; a generator for a reference, fixed voltage level signal; an input bank of normally open switches, each connected to an element; a first chopper means coupled to said generator and said input bank; RF amplification circuitry connected to said first chopper means and receiving alternately the reference and a sensed signal therefrom; a second chopper means connected to said circuitry for separating the amplified reference and sensed signals; a trigger circuit connected to said second chopper means, said trigger circuit having components for generating a control signal when there is an E.M.F. variation between the reference and sensed signals; an output bank of normally open switches for connecting the trigger circuit to said relays; a scanning device coupled with said banks for sequentially closing corresponding switches in the input and output banks; and motive means coupled with the device for moving the latter from switch to switch in cyclical synchronism with said first and second chopper means.

15. A multi-point condition control system comprising: a plurality of sensing elements divided into two or more zones, each element being adapted to forward a voltage signal; a relay means for each element, each relay means being adapted to control a sensed condition; a circuit having components for generating a reference, fixed voltage level signal, chopping the reference and a sensed signal at line frequency, comparing the levels of the chopped signals, and generating a control signal when there is an E.M.F. variation; input and output banks of normally open switches for connecting the elements to said circuit and the circuit to said relays, the switches in each bank being circularly disposed and radially aligned with the corresponding switch in the other bank; a rotatable scanner device situated adjacent said switches, the latter being magnetically responsive and said device having magnetic means thereon; motive means coupled with the device for moving it from switch to switch in cyclical synchronism with said chopping component; and zone selection means for automatically switching said circuit and said banks from zone to zone.

16. The control system of claim 15 wherein a voltage dividing network is provided for each zone of elements, said network including a plurality of parallel connected resistances, each of said elements being individually connected to one of said resistances through a slidable tap with the circuits being completed through a zone tap slidable relative to another of said resistances, said taps permitting calibration of the elements and zones respectively to a set point E.M.F. equal to that of the reference signal.

17. The control system of claim 16 wherein means is provided for checking the operation of the system, said checking means comprising: a pair of check taps connected to said network to pick off voltages respectively above and below that on the zone tap; and a switch normally in contact with the zone tap, said switch being mounted for swinging movement from the zone tap to either of said check taps whereby to send known error signals into the system.

18. The control system of claim 15 wherein each of said relay means comprises: a memory relay including a relay coil and a relay switch, said relay coil being connected to a switch in said output bank for actuating said relay switch when a control signal is generated; a holding circuit connected to said memory relay coil; a power relay adapted to control the sensed condition; and a normally open control circuit connecting the memory relay switch to said power relay, said relay switch being in said normally open circuit, said zone selection means including components for closing said normally open circuit before switching said input and output banks to the succeeding zone.

19. The control system of claim 18 wherein said components include a synchronous motor and a transfer switch in said normally open circuit, said transfer switch being coupled with said motor for closing said normally open circuit when the selected zone has been scanned, said motor having an adjustable frame whereby the phase position of the motor may be advanced or retarded to synchronize actuation of said transfer switch with a zero current point of the line frequency.

20. A multi-point condition control system comprising: a plurality of electrical condition-controlling devices; a condition responsive, signal-forwarding sensing element associated with each condition; a circuit having components for generating a reference signal, chopping the reference signal with successive sensed signals, amplifying the chopped signals, separating the amplified signals and generating a control signal when a sensed signal differs from the reference signal; and a high speed scanning switch assembly for sequentially and substantially simultaneously coupling said circuit between said elements and their respective condition-controlling devices, said switch assembly being in cyclical synchronism with said chopping and separating components.

21. In a multi-point control system in which a plurality of sensing elements are each connected to fixed contacts of a scanner switch assembly having a movable contact driven by a synchronous motor: a variable resistance voltage divider circuit coupled with each element to permit adjustment of the signal level therefrom including the biasing out of induced voltages, said motor having an adjustable frame whereby the phase position of the motor may be advanced or retarded to synchronize actuation of the switch assembly with a desired point on the line frequency.

22. A multi-point condition control system comprising: a plurality of individual sensing elements, each adapted to forward a voltage signal; a generator for a reference, fixed voltage level signal; an input chopper means receiving the output of said generator; a switch assembly sequentially coupling the elements to said input chopper means; an RF amplification circuit connected to said input chopper means for alternately processing the reference and a sensed signal; a signal comparison circuit; and an output chopper means interconnecting the amplification and comparison circuits, the latter being adapted to generate a control signal when there is an E.M.F. variation between the reference and a sensed signal, said input and output chopper means and said switch assembly each including a relay for the actuation thereof, said relays being energized by and operable at line frequency.

References Cited by the Examiner

UNITED STATES PATENTS

| | | | |
|---|---|---|---|
| 2,449,083 | 9/1948 | Muir | 318—437 |
| 2,493,921 | 1/1950 | Meneley | 318—437 |
| 2,560,829 | 7/1951 | Stewart | 73—341 |
| 2,578,447 | 12/1951 | Odell | 340—227 X |
| 2,591,617 | 4/1952 | Savino | 340—150 |
| 2,610,270 | 9/1952 | Schafer | 200—87 |
| 2,620,136 | 12/1952 | Levine | 236—78 |
| 2,683,214 | 7/1954 | Henquet et al. | 328—146 |
| 2,730,304 | 1/1956 | Markow. | |
| 2,764,714 | 9/1956 | Heyduck | 317—137 |
| 2,820,118 | 1/1958 | Zantop | 200—87 |
| 2,839,737 | 6/1958 | Dalglish | 340—150 |
| 2,887,624 | 5/1959 | Hertog | 317—137 |
| 2,897,485 | 7/1959 | Johnson | 340—228 |
| 2,929,054 | 3/1960 | Golden et al. | 73—341 X |
| 2,946,961 | 7/1960 | Lind | 328—146 |
| 2,981,107 | 4/1961 | Anderson | 73—341 |
| 2,999,914 | 9/1961 | Stanaway | 200—87 |
| 3,013,137 | 10/1961 | Vanden Broeck | 200—87 |
| 3,065,462 | 11/1962 | Maltby et al. | 340—228 |
| 3,070,786 | 12/1962 | MacIntyre | 330—9 |
| 3,089,097 | 5/1963 | Bell | 330—9 |
| 3,122,698 | 2/1964 | Ladd | 323—43.5 |
| 3,130,373 | 4/1964 | Braymer | 330—9 |
| 3,154,734 | 10/1964 | Pinney et al. | 323—43.5 |

LOUIS R. PRINCE, *Primary Examiner.*

E. R. REYNOLDS, ISAAC LISANN, *Examiners.*

V. L. CARNEY, R. F. BEERS, C. CARTER ELLS, STEVEN H. BAZERMAN, *Assistant Examiners.*